(12) United States Patent
Christ

(10) Patent No.: US 8,635,894 B2
(45) Date of Patent: Jan. 28, 2014

(54) HOLLOW BOLT COMPRISING A LONGITUDINAL BORE

(75) Inventor: Eberhard Christ, Tambach-Dietharz (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 894 days.

(21) Appl. No.: 11/921,773

(22) PCT Filed: May 31, 2006

(86) PCT No.: PCT/EP2006/005186
§ 371 (c)(1),
(2), (4) Date: Apr. 6, 2009

(87) PCT Pub. No.: WO2006/131248
PCT Pub. Date: Dec. 14, 2006

(65) Prior Publication Data
US 2010/0054893 A1    Mar. 4, 2010

(30) Foreign Application Priority Data

Jun. 10, 2005  (DE) .................. 10 2005 026 883

(51) Int. Cl.
*B21D 17/04* (2006.01)
*B23G 9/00* (2006.01)
*F16B 35/00* (2006.01)
*F16B 35/04* (2006.01)

(52) U.S. Cl.
USPC .................. 72/88; 470/10; 470/11; 411/395; 411/417

(58) Field of Classification Search
USPC .......... 72/103, 104, 88, 90; 470/84, 204, 8, 9, 470/10, 11, 57, 58, 66
See application file for complete search history.

(56) References Cited

U.S. PATENT DOCUMENTS

| | | | | |
|---|---|---|---|---|
| 1,693,487 A | * | 11/1928 | Mansfield | 72/208 |
| 1,865,575 A | * | 7/1932 | Locke | 72/97 |
| 1,910,215 A | * | 5/1933 | Einwaechter, Jr. et al. | 411/381 |
| 2,232,336 A | * | 2/1941 | Meersteiner | 411/421 |
| 2,318,326 A | * | 5/1943 | Padley et al. | 76/108.1 |
| 2,556,174 A | * | 6/1951 | Evans | 470/84 |
| 2,562,516 A | | 7/1951 | Williams | |
| 2,586,653 A | * | 2/1952 | Hill | 29/890.036 |
| 2,844,830 A | * | 7/1958 | Evans | 470/16 |
| 3,455,360 A | * | 7/1969 | Simons | 411/301 |
| 3,492,908 A | * | 2/1970 | Thurston | 411/418 |

(Continued)

FOREIGN PATENT DOCUMENTS

| | | |
|---|---|---|
| CH | 587 088 A5 | 4/1977 |
| DE | 1 921 229 A1 | 11/1970 |

(Continued)

*Primary Examiner* — Dana Ross
*Assistant Examiner* — Lawrence Averick
(74) *Attorney, Agent, or Firm* — Birch, Stewart, Kolasch & Birch, LLP

(57) ABSTRACT

A process for producing hollow bolts including a longitudinal bore with the hollow bolts being provided with circumferential notches. The hollow bolts are provided with longitudinal grooves extending between elevations determining the bolt diameter, wherein circumferential notches are rolled onto the hollow bolts provided with the longitudinal grooves and the elevations, the longitudinal grooves being of such cross-section that some of the material displaced during rolling-on of the notches flows into the longitudinal grooves.

20 Claims, 1 Drawing Sheet

(56) References Cited

U.S. PATENT DOCUMENTS

| | | | |
|---|---|---|---|
| 3,495,494 A * | 2/1970 | Scott | 411/411 |
| 3,731,724 A * | 5/1973 | Dorflinger | 411/302 |
| 4,043,173 A * | 8/1977 | Marciniak et al. | 72/403 |
| 4,348,141 A * | 9/1982 | Dahl | 411/389 |
| 4,712,957 A * | 12/1987 | Edwards et al. | 411/82.1 |
| 5,961,267 A | 10/1999 | Goss et al. | |
| 6,514,593 B1 * | 2/2003 | Jones et al. | 428/100 |
| 6,886,384 B2 * | 5/2005 | Gray | 72/103 |
| 6,926,484 B2 * | 8/2005 | Kram et al. | 411/311 |
| 7,237,424 B2 * | 7/2007 | Crutchley | 72/401 |
| 7,354,350 B2 * | 4/2008 | Hechtle et al. | 470/204 |
| 2010/0052280 A1 * | 3/2010 | Bilmayer et al. | 280/93.514 |

FOREIGN PATENT DOCUMENTS

| | | |
|---|---|---|
| DE | 199 47 311 A1 | 4/2001 |
| DE | 100 30 363 A1 | 1/2002 |
| DE | 101 62 858 A1 | 6/2003 |
| DE | 103 09 297 A1 | 9/2004 |
| DE | 103 19 236 A1 | 11/2004 |
| DE | 103 53 727 A1 | 2/2005 |
| GB | 1 219 237 | 1/1971 |
| JP | 2-6029 A | 1/1990 |

* cited by examiner

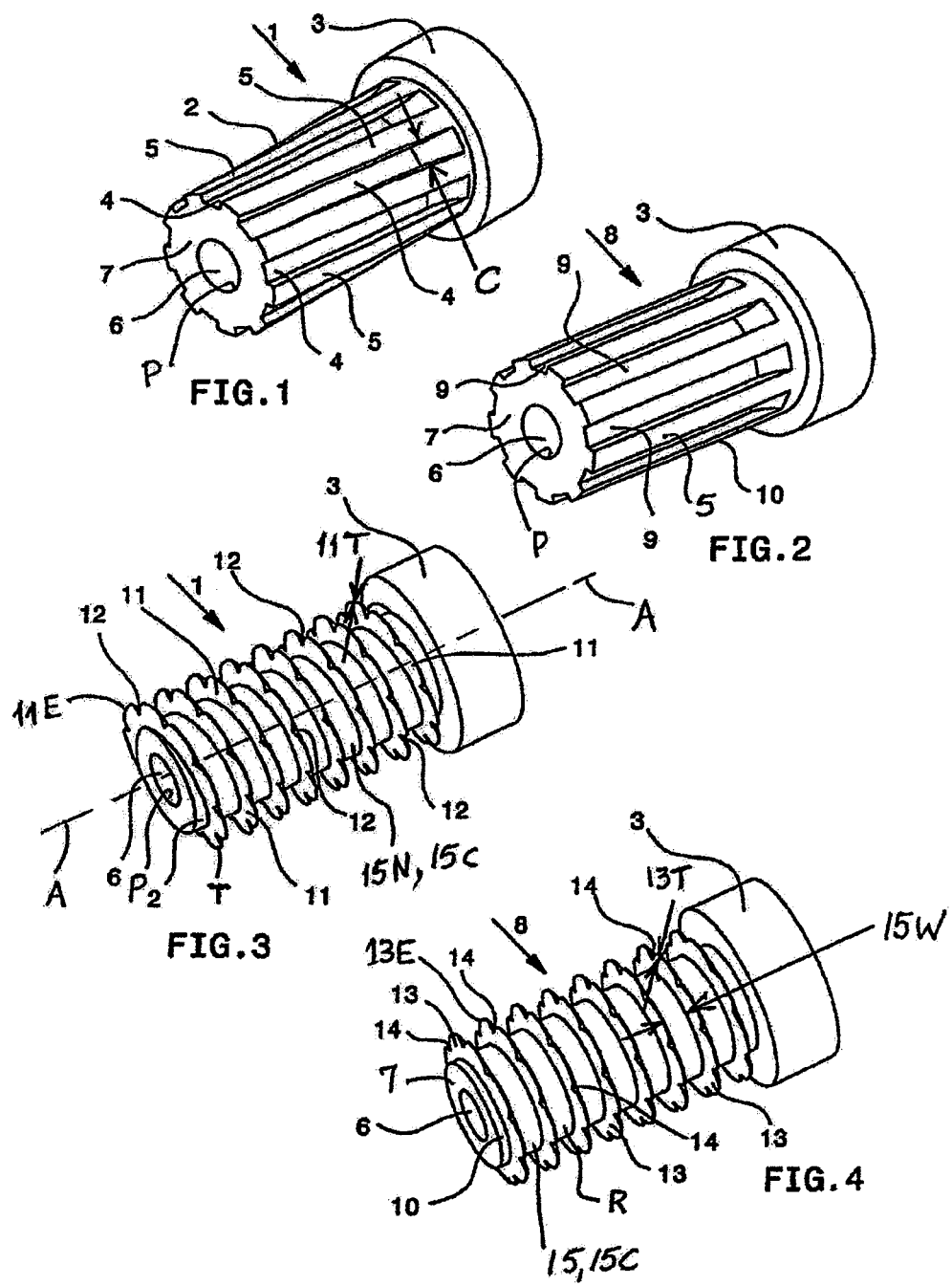

HOLLOW BOLT COMPRISING A LONGITUDINAL BORE

BACKGROUND OF THE INVENTION

1. Field of the Invention

The invention relates to a hollow bolt comprising a longitudinal bore, said hollow bolt being provided with circumferential notches.

The hollow bolt provided with circumferential notches may be a stud bolt or a bolt with annular notches, of the kind used, for example, for latching on any plastic components provided with appropriate holes.

2. Description of Background Art

Bolts comprising a longitudinal bore, so-called hollow bolts, are frequently used in bolted connections which require subsequent adjustment of a component held by the bolt, for which purpose some adjusting connector is operated, for example using a screwdriver which is guided by the longitudinal bore in the hollow bolt. The production of such hollow bolts provided with circumferential notches is difficult if the circumferential notches, i.e. more particularly a thread, are to be rolled onto the hollow bolt. In such a case, owing to the considerable pressures that occur, the hollow bolt tends towards radial deformation, since the interior thereof, because of the longitudinal bore, lacks the necessary material for taking up the considerable pressures. For this reason, hollow bolts with rolled-on threads are produced such that, first, the thread is rolled onto a solid blank and, next, the bolt is provided with the longitudinal bore by drilling, this being an additional operation which makes the production of such hollow bolts considerably more expensive.

SUMMARY AND OBJECTS OF THE INVENTION

The object of the invention, therefore, is to create a hollow bolt comprising a longitudinal bore in which circumferential notches can be applied to the blank by rolling, without the risk of deformation of the blank provided with the longitudinal bore. The object of the invention is achieved in that the hollow bolts are provided with longitudinal grooves extending between elevations determining the bolt diameter, wherein circumferential notches are rolled onto the hollow bolts provided with the longitudinal grooves and the elevations, the longitudinal grooves being of such cross-section that some of the material displaced during rolling-on of the notches flows into the longitudinal grooves.

The longitudinal grooves extending along the hollow bolt, which is initially still free of the notches, give rise, during the rolling of the notches, to pressures on the deformed material of the hollow bolt, said material being able to escape into open spaces formed by the longitudinal grooves, this correspondingly reducing the pressure exerted by rolling tools and acting on the material of the hollow bolt. This pressure reduction is so great that, despite its longitudinal bore, the hollow bolt is not deformed during this operation, it being the case that the material escaping during rolling of the notches is displaced into the regions of the longitudinal grooves, this resulting virtually in threads or rings devoid of any extended interruption by the longitudinal grooves. In this regard, a short gap in the threads is usually even desirable, particularly if the thread is of the self-tapping type, because the gaps in the rolled thread give rise to edges which facilitate the tapping of the female thread. The material of the female thread can then also flow into said gaps, this additionally increasing the loosening torque of such a bolt.

The rolling of a thread onto a bolt which, prior to the rolling-on of the thread, has had rolled onto it helical grooves of high pitch, is in effect known from U.S. Pat. No. 2,562,516. The helical grooves, which interrupt the subsequently rolled-on thread at a plurality of points, are intended to produce cutting teeth in the thread which are intended to facilitate the tapping of a female thread by the bolt. The bolt itself is solid in form, i.e. it has no longitudinal bore. Therefore, the patent specification also contains no disclosure on how to take into consideration the particular circumstances of a hollow bolt comprising a longitudinal bore.

The invention relates further to a hollow bolt provided with longitudinal grooves extending between elevations determining the bolt diameter, wherein circumferential notches are rolled onto the hollow bolt provided with the longitudinal grooves and the elevations, the longitudinal grooves being of such cross-section that some of the material displaced during rolling-on of the notches flows into the longitudinal grooves.

The notches may be primarily a thread. Alternatively, however, it is also possible for the notches to be in the form of rings, for which there are also known applications.

There are various possibilities for the design of the longitudinal grooves. The longitudinal grooves may extend parallel to the axis of the hollow bolt. Alternatively, however, it is also possible for the longitudinal grooves to extend at an inclined angle to the axis of the hollow bolt. In any case, the longitudinal grooves cross the rolled-on notches, irrespective of whether said notches form a thread or rings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a hollow bolt with diagonally extending longitudinal grooves, without circumferential notches;

FIG. 2 shows a similar hollow bolt with longitudinal grooves extending parallel to the axis thereof;

FIG. 3 shows a hollow bolt according to FIG. 1 with rolled-on thread;

FIG. 4 shows a hollow bolt according to FIG. 2 with rolled-on rings.

DETAILED DESCRIPTION OF THE PREFERRED EMBODIMENTS

FIG. 1 presents the hollow bolt 1 with its shank 2 and its head 3. The shank 2 is provided with the longitudinal grooves 4, which extend between the elevations 5.

The longitudinal elevations 5, with their outer surface, determine the diameter of the bolt shank 2. The hollow bolt 1 is penetrated over its entire length by the longitudinal bore 6. As can be seen in FIG. 1, hollow bolt 1 has an axis A, and a flat end wall 7 formed on an end opposite to head 3.

The longitudinal grooves 4, which have cross-sections C, may be applied in any desired manner to the shank 2, e.g. by rolling or pressing. In the course of a further production process, which will be discussed more fully hereinbelow, the thus produced hollow bolt 1 is then provided a continuous, spiral-shaped notch 15N as presented in FIG. 3, and with circumferential notches 15, as presented in FIG. 4.

FIG. 2 presents a similar design of a hollow bolt 8, which differs from the hollow bolt 1 in FIG. 1 in that the longitudinal grooves 9 extend axially parallel to the shank 10 of the hollow bolt 8.

The hollow bolts according to FIGS. 1 and 2 form a type of blank for the further production process of the hollow bolt according to the invention, which hollow bolt is presented in its final form in FIGS. 3 and 4.

The hollow bolt 1 presented in FIG. 3 was created by rolling a spiral-shaped thread T extending along the length of shank 2 from near the head 3 to the end wall 7 of the hollow bolt 1 in FIG. 1, for which purpose a continuous, spiral-shaped thread T was rolled onto the hollow bolt 1 from FIG. 1, the spiral-shaped thread T forming elevated turns 11. When the turns are being rolled, the individual turns 11 are formed from the material of the hollow bolt 1. The continuous, spiral-shaped notch 15N is formed between the elevated turns 11 of the spiral-shaped thread T. The spiral shaped notch 15N has a cylinder-shaped bottom 15C. In addition, the width 15W of the spiral-shaped notch 15N is greater than thicknesses 11T of the elevated turns 11. The elevated turns 11 winding around the shank 2 of the hollow bolt 1 and have shallow, V-shaped gaps 12, which are spaced apart from each other on the outer edge 11E of the elevated turns 11. The gaps 12 are caused by the longitudinal grooves 4, it being the case that, owing to the flow of material, the longitudinal grooves 4 contract to form V-shaped gaps 12, that are width-reduced in a circumferential direction, and shallow in a radial direction of the hollow bolt 1. In other words, V-shaped gaps 12 extend only part way inwardly in a radial direction toward the cylinder-shaped bottom 15C of the spiral-shaped notch 15N. As such, inner most portions of the V-shaped gaps 12 are separated in a radial direction from the cylinder-shaped bottom 15C of the spiral-shaped notches 15N. This is attributable to the fact that, during the rolling of the thread with the turns 11, the material of the shank 2 of the bolt flows into the longitudinal grooves 4, thereby leaving the V-shaped 12, which are reduced in width as compared with the longitudinal grooves 4. The wider are the longitudinal grooves 4, the wider are the gaps 12. In the case of particularly narrow longitudinal grooves 4, the gaps 12 contract to such an extent that they are virtually entirely closed. The thus enabled flow of material of the shank 2 gives rise to the aforementioned reduction in the pressure of the rolling tools on the hollow bolt 1, the consequence of which is that there is no deformation of the annular perimeter P of the bore 6 according to the surface of the end wall 7 of the bolt 1.

The shank 10 of hollow bolt 8 in FIG. 4, which is provided with individual, rolled, circumferential notches 15, refers back to the hollow bolt 8 presented in FIG. 2. Hollow bolt 8 has axially parallel longitudinal grooves 9 extending along the length of shank 10 from near the head 3 to the end wall 7 of shank 10. During the rolling of the notches 15 around the circumference of the shank 10 presented in FIG. 4, the longitudinal grooves 9 resulted in individual circumferential elevations 13 which are interrupted by the V-shaped gaps 14 (similarly to the V-shaped gaps 12 in FIG. 3). With regard to the creation of the gaps 14 and their impact, reference is made to the above explanatory remarks in connection with FIG. 3. As can be seen in FIG. 4, gaps 14 are spaced apart from each other on the outer edge 13E of each of the circumferential elevations 13. In addition, the circumferential notches 15 are circular rings R between the circumferential elevations 13, and have cylinder-shaped bottoms 15C. Further, the circumferential notches 15 have widths 15W that are greater than thicknesses 13T of the circumferential elevations 13.

It may additionally be pointed out that the circumferential elevations 13 are, of course, also possible where the hollow bolt 1 is of a design according to FIG. 1, i.e. where the hollow bolt 1 is provided with diagonally extending longitudinal grooves 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Process for producing hollow bolts comprising the following steps:
   forming a longitudinal bore in a shank of the bolt;
   forming longitudinal grooves extending along a length of the shank from near the head of hollow bolt to a lower end of the shank, the longitudinal grooves being spaced apart from each other by longitudinal elevations;
   after forming the longitudinal grooves and the longitudinal elevations on the shank, the method further comprising the step of:
   rolling circumferential notches onto the shank of the hollow bolt, in a manner such that the circumferential notches are separated from each other by circumferential elevations, and
   the longitudinal grooves including a cross-section (C), wherein part of material of the shank displaced during forming of the circumferential notches by rolling flows into the longitudinal grooves without deformation of an annular perimeter of the longitudinal bore, and
   wherein the step of rolling the circumferential notches further comprising:
   providing cylinder-shaped bottoms in each of the circumferential notches, and
   providing V-shaped gaps which are spaced apart from each other along an outer circumferential edge of the circumferential elevations,
   wherein the V-shaped gaps are provided only in positions spaced radially outwardly and apart from where the longitudinal grooves were previously formed.

2. A hollow bolt, comprising:
   a bolt head on a proximal end of the hollow bolt,
   a shank extending axially from the head to a distal end of the hollow bolt;
   a longitudinal bore extending axially though the shank of the hollow bolt;
   circumferential notches separated by circumferential elevations formed along a length of shank from a position near the head to the distal end of the hollow bolt,
   wherein the circumferential notches are provided with cylinder-shaped bottoms, and
   wherein the circumferential elevations extend radially outward from the cylinder-shaped bottoms of the circumferential notches, and
   an outer circumferential elevations is provided with a series of projections, each of which has a continuous, convex-shaped, the convex-shaped, the convex-shaped projections being arranged adjacent to each other in a manner such that a V-shaped gap which opens radially outwardly is formed between each pair of the adjacent convex-shaped projections.

3. The hollow bolt according to claim 2, wherein the circumferential notches form circular rings (R) separated from each other by the circumferential elevations.

4. The process according to claim 1, the steps of forming the longitudinal grooves including: forming at least three of the longitudinal grooves extending parallel to an axis of the hollow bolt.

5. The process according to claim 1, the step of rolling further comprising:
forming a series of projections, each of which has a continuous, convex-shape,
the convex-shaped projections being arranged adjacent to each other along the circumferential edge of the circumferential elevations in a manner so as to join each other, and so that the V-shaped gaps opens radially outwardly between each pair of the adjacent convex-shaped projections.

6. The process according to claim 1, further comprising: providing each of the circumferential elevations with at least three V-shaped gaps.

7. The process according to claim 2, wherein each of the circumferential elevations with at least three V-shaped gaps.

8. The hollow bolt according to claim 2, wherein the V-shaped gaps on each of the circumferential elevations are arranged the same radial directions.

9. The process according to claim 1, wherein the circumferential notches have cylinder-shaped bottoms having widths that are greater than thicknesses of the circumferential elevations.

10. The hollow bolt according to claim 2, wherein the circumferential notches have cylinder-shaped bottoms having widths that are greater than thicknesses of the circumferential elevations.

11. The process according to claim 1, wherein the step of rolling further providing the V-shaped gaps that extend only part way inwardly in a radial direction toward the cylinder-shaped bottoms of the circumferential notches, so that the V-shaped gaps are separated in the radial direction from the cylinder-shaped bottoms of the circumferential notches.

12. The hollow bolt according to claim 2, wherein the V-shaped gaps extend only part way inwardly in a radial direction toward the cylinder-shaped bottoms of the circumferential notches, so that the V-shaped gaps are separated in the radial direction from the cylinder-shaped bottoms of the circumferential notches.

13. The process according to claim 1, wherein the step of rolling causes the circumferential notches to be parallel to each other.

14. The hollow bolt according to claim 2, wherein the circumferential notches are parallel to each other.

15. The hollow bolt according to claim 1, wherein the step of rolling causes the circumferential notches to extend continuously around the shank.

16. The hollow bolt according to claim 2, wherein the circumferential notches extend continuously around the shank.

17. Process for producing hollow bolts comprising the following steps: forming a longitudinal bore in a shank of the bolt;
forming longitudinal grooves extending along a length of the shank from near the head of hollow bolt to a lower end of the shank, wherein the longitudinal grooves are inclined at an angle to an axis of the hollow bolt and are spaced apart from each other by longitudinal elevations;
after forming the longitudinal grooves and the longitudinal elevations on the shank, the method further comprising the step of:
rolling a continuous, spiral-shaped thread winding around substantially an entire length of the shank, in a manner such that elevated turns of the spiral-shaped thread are separated from each other by a continuous, spiral-shaped notch, and
the longitudinal grooves including a cross-section (C), wherein part of material of the shank displaced during forming of the spiral-shaped thread and spiral-shaped notch by rolling flows into the longitudinal grooves without deformation of an annular perimeter of the longitudinal bore, and
wherein the step of rolling further comprising:
providing a cylinder-shaped bottom in the spiral-shaped notch, and providing V-shaped gaps which are spaced apart from each other along an outer circumferential edge of each of the elevated turns of the spiral-shaped thread,
the V-shaped gaps being provided only in positions spaced radially outwardly and apart from where the longitudinal grooves were previously formed.

18. The process according to claim 17, the step of forming the longitudinal grooves further comprising: forming at least three of the longitudinal grooves and three longitudinal elevations.

19. The process according to claim 17, the step of rolling further comprising: providing the V-shaped gaps which extend only part way inwardly in a radial direction toward the cylinder-shaped bottom of the spiral-shaped notch, so that the V-shaped gaps are separated in the radial direction from the cylinder-shaped bottom of the spiral-shaped notch.

20. The process according to claim 18, the step of rolling further comprising:
forming a series of series of projection, each if which has a continuous convex-shaped, the convex-shaped projections being arranged adjacent to each other along the circumferential edge of the circumferential elevations in a manner so as to join each other, and so that one of the V-shaped gaps opens radially outwardly between each pair of the adjacent convex-shaped projections.

* * * * *